(12) United States Patent
Lewis et al.

(10) Patent No.: US 6,640,233 B1
(45) Date of Patent: Oct. 28, 2003

(54) RESERVING FILE SYSTEM BLOCKS

(75) Inventors: Blake Lewis, Palo Alto, CA (US); Kayuri Patel, Cupertino, CA (US); Ray Chen, Campbell, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 338 days.

(21) Appl. No.: 09/642,063

(22) Filed: Aug. 18, 2000

(51) Int. Cl.$^7$ .............................................. G06F 12/00
(52) U.S. Cl. ........................... 707/205; 707/200; 707/1; 711/100
(58) Field of Search .......................... 707/1, 2, 10, 200, 707/205, 201, 203, 204; 709/214, 215, 216; 711/129, 170, 100

(56) References Cited

U.S. PATENT DOCUMENTS

| | | | | |
|---|---|---|---|---|
| 4,593,354 A | * | 6/1986 | Ushiro .......................... | 714/48 |
| 4,937,763 A | | 6/1990 | Mott ............................ | 364/550 |
| 5,067,099 A | | 11/1991 | McCown et al. ............. | 364/550 |
| 5,237,682 A | * | 8/1993 | Bendert et al. .............. | 707/205 |
| 5,566,331 A | * | 10/1996 | Irwin et al. ................... | 707/10 |
| 5,649,152 A | * | 7/1997 | Ohran et al. ................. | 711/114 |
| 5,819,292 A | * | 10/1998 | Hitz et al. .................... | 707/203 |
| 5,828,876 A | * | 10/1998 | Fish et al. ..................... | 707/1 |
| 5,907,672 A | * | 5/1999 | Matze et al. ................. | 711/162 |
| 5,956,745 A | * | 9/1999 | Bradford et al. .............. | 360/48 |
| 5,963,962 A | * | 10/1999 | Hitz et al. .................... | 707/201 |
| 6,101,585 A | * | 8/2000 | Brown et al. ................. | 707/204 |
| 6,138,126 A | * | 10/2000 | Hitz et al. .................... | 707/202 |
| 6,311,193 B1 | * | 10/2001 | Sekido ......................... | 707/202 |
| 6,366,988 B1 | * | 4/2002 | Skiba et al. .................. | 707/203 |
| 6,374,268 B1 | * | 4/2002 | Testardi ....................... | 707/205 |
| 6,418,449 B1 | * | 7/2002 | Chen et al. .............. | 707/104.1 |
| 6,434,681 B1 | * | 8/2002 | Armangau .................. | 711/162 |
| 6,473,775 B1 | * | 10/2002 | Kusters et al. .............. | 707/200 |
| 6,480,969 B1 | * | 11/2002 | Hitz et al. ..................... | 714/6 |
| 6,484,186 B1 | * | 11/2002 | Rungta ........................ | 707/203 |

FOREIGN PATENT DOCUMENTS

EP     0537098     4/1993

OTHER PUBLICATIONS

David Hitz, "File System Design for an NFS File Server Applicance", Technical Report 3002, Presented Jan. 19, 1994. USENIX Winter 1994, San Francisco, California.*

* cited by examiner

*Primary Examiner*—Greta Robinson
*Assistant Examiner*—Miranda Le
(74) *Attorney, Agent, or Firm*—Swernofsky Law Group PC

(57) ABSTRACT

A system that manages a file system for a file server. A file operation is received that signals a reservation operation for a file having a file size. Preferably, the file system uses a write anywhere file system layout, the file operation that signals the reservation operation is a zero length write request, and the file operation that signals the reservation operation includes a parameter that specifies the file size. A number of blocks needed to be reserved to accommodate the file is computed. Preferably, computing the number of blocks needed to be reserved to accommodate the file includes determining a total number of direct and indirect blocks needed to accommodate the file size, and subtracting a total number of blocks already allocated for the file and a total number of cached unallocated blocks for the file from the total number of direct and indirect blocks needed to accommodate the file size. A number of unallocated blocks is reserved in the file system, with the number of reserved blocks equal to the number of blocks needed to be reserved to accommodate the file. Reserving the number of blocks preferably includes setting a flag in an inode for the file that indicates blocks have been reserved for the file, and incrementing a reserved block count in a file system information block by the number of blocks needed.

30 Claims, 5 Drawing Sheets

RESERVING FILE SYSTEM BLOCKS

BACKGROUND OF THE INVENTION

1. Field of the Invention

This invention relates to management of a file system for a file server. In particular, the invention concerns reserving unallocated blocks of the file system based upon a file size for a file.

2. Description of the Related Art

Some conventional file servers (also called "filers") manage space in a file system by allocating blocks to a file as data for that file is written to the file system. Thus, if the file system runs out of space, a file could end up partially written.

Other conventional file servers, in particular those running CIFS, can allocate blocks for an entire file upon creation of the file. These file servers write zero data to the file system for these blocks. However, this approach is expensive in terms of time required to write the zero data. Furthermore, this approach is actually counterproductive for file servers that use a write anywhere file system layout, also known as WAFL file servers.

In WAFL file servers, when a file is overwritten, new data is written to new blocks, and then the previously allocated blocks are released. Thus, new data is written to different blocks than the previously allocated blocks, resulting in use of extra space for the new blocks until the previously allocated blocks are released. If the file server is close to full, this duplication of blocks could use up the remaining blocks, preventing complete writing of the data.

SUMMARY OF THE INVENTION

Accordingly, what is needed is a way to ensure that enough blocks are reserved for a file so as to ensure that the entire file can be written to a file system, without actually allocating disk blocks to the file.

In one aspect, the invention addresses the foregoing need through a method of managing a file system for a file server. According to the method, a file operation is received that signals a reservation operation for a file having a file size. Preferably, the file system uses a write anywhere file system layout, the file operation that signals the reservation operation is a zero length write request, and the file operation that signals the reservation operation includes a parameter that specifies the file size. A number of blocks needed to be reserved to accommodate the file is computed. Preferably, computing the number of blocks needed to be reserved to accommodate the file includes determining a total number of direct and indirect blocks needed to accommodate the file size, and subtracting a total number of blocks already allocated for the file and a total number of cached unallocated blocks for the file from the total number of direct and indirect blocks needed to accommodate the file size. Unallocated blocks are reserved in the file system, with the number of reserved blocks equal to the number of blocks needed to be reserved to accommodate the file. Reserving the number of blocks preferably includes setting a flag in an inode for the file that indicates blocks have been reserved for the file, and incrementing a reserved block count in a file system information block by the number of blocks needed. The reserved block count indicates how many unallocated blocks have been reserved for files in the file system.

In a preferred embodiment, the method also includes the step of checking that a number of available blocks in the file system is greater than the number of blocks needed to be reserved to accommodate the file. An error is returned in a case that the number of available blocks is less than the number of blocks needed. The number of available blocks in the file system preferably is determined by subtracting a number of allocated blocks, a number of cached unallocated blocks (i.e., delayed allocated blocks), and a number of reserved blocks from a total number of blocks in the file system, and adding to this a number of reserved cached unallocated blocks.

Also in the preferred embodiment, the file server checks that the number of blocks needed to be reserved to accommodate the file does not exceed a remainder of a quota for an owner of the file. An error is returned in a case that the number of blocks needed exceeds the remainder of the quota.

When data is written to the file system, blocks are cached in a buffer cache. At a later point in time, the blocks are stored to storage for the file system. Prior to writing the blocks to disk, the blocks are actually allocated to the files. Reservation of those blocks is released as the blocks are written to storage. Releasing reservation of blocks is accomplished by decrementing the reserved block count in the file system information block by a number of released blocks.

By virtue of the foregoing operations, a file server reserves unallocated blocks for a file for which file reservation semantics are activated. These reserved blocks are not actually allocated by the reservation process. Rather, a count is maintained of how many blocks need to be kept available for the file system. This count is utilized when space availability for the file system is checked, thereby helping to ensure that enough blocks are available for files that have reserved file space.

In another aspect, the foregoing method handles receipt of a file operation that signals a reservation operation for a file for which reservation has already been performed, in which the reservation operation specifies a new file size different from a current file size for the file. When such a file operation is received, additional blocks may need to be reserved to accommodate the new file. According to the method, a current file size for the file and the new file size are compared. In a case that the current file size exceeds the new file size, remaining block reservations for the file are released. In a case that the new file size exceeds the current file size, an additional number of unallocated blocks are reserved in the file system. According to this embodiment of the invention, the additional number of unallocated blocks to be reserved equals a difference between a total number of direct and indirect blocks required by the new file size and a total number of direct and indirect blocks required by the current file size.

By virtue of the foregoing operation, changes in file size for a file can be appropriately reflected in the block reservations.

Each of the foregoing methods can be used in conjunction with the others in various combinations to perform reservation operations. The invention also can be embodied in apparatuses such as file servers and/or other hardware configured to perform the foregoing methods, computer readable code by itself or embodied in a computer program product to cause a computer to perform the foregoing methods, and a memory storing information including instructions executable by a processor to perform the foregoing methods.

This brief summary has been provided so that the nature of the invention may be understood quickly. A more complete understanding of the invention may be obtained by reference to the following description of the preferred embodiments thereof in connection with the attached drawings.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors or special purpose processors adapted to particular process steps and data structures operating under program control, that such process steps and data structures can be embodied as information stored in or transmitted to and from memories (e.g., fixed memories such as DRAMs, SRAMs, hard disks, caches, etc., and removable memories such as floppy disks, CD-ROMs, data tapes, etc.) including instructions executable by such processors (e.g., object code that is directly executable, source code that is executable after compilation, code that is executable through interpretation, etc.), and that implementation of the preferred process steps and data structures described herein using such equipment would not require undue experimentation or further invention.

Figure 1:
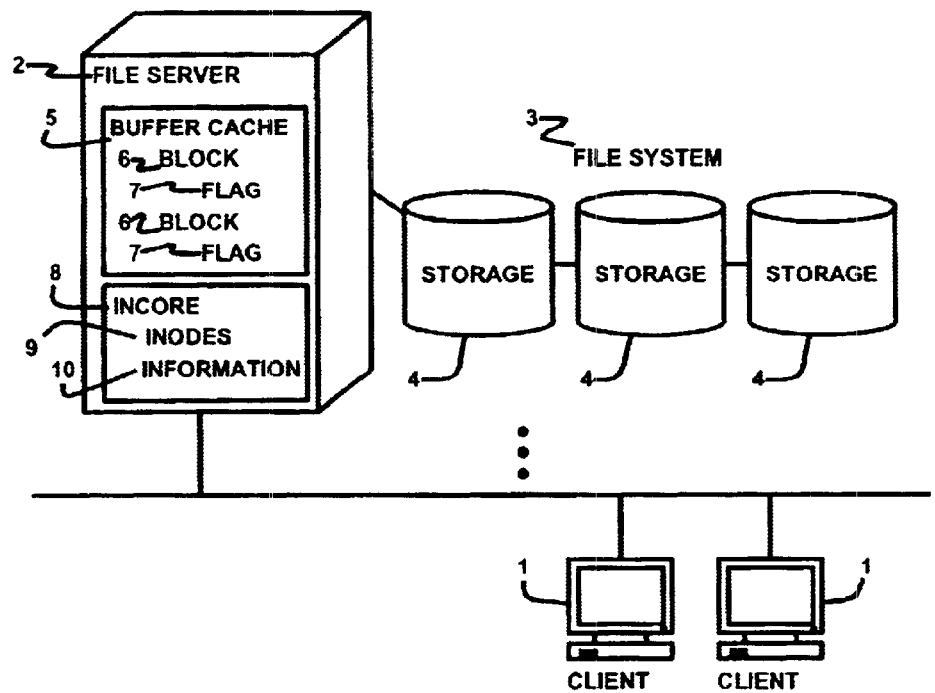
FIG. 1 shows an environment in which a file server manages a file system according to the invention.

FIG. 1 shows an environment in which a file server manages a file system according to the invention. In FIG. 1, clients 1 send data to and retrieve data from server 2, which stores the data in file system 3. File system 3 includes storage 4 such as multiple hard disk drives, multiple optical drives, or any other mass storage. Information is stored in storage 4 in blocks, as explained in more detail below with reference to FIG. 2. Preferably, file system 3 uses a write anywhere file system layout (WAFL).

When data is sent to server 2, that data is initially stored in buffer cache 5 before being written to file system 3. Data in buffer cache 5 also is stored in blocks, which are shown as cached blocks 6 in FIG. 1. According to the invention, each cached block 6 preferably includes flag 7 that indicates whether or not the block was cached in buffer cache 5 after block reservation according to the invention was activated for the file to which the block belongs. The operation of flag 7 is discussed below with respect to FIGS. 3 to 8.

Blocks in buffer cache 5 can be copies of allocated blocks already written to storage 4, or unallocated blocks which have not yet been written to storage 4. An allocated block has a block identification number (not shown) associated therewith that indicates to which block of storage 4 it corresponds. An unallocated blocks has no such block identification number associated therewith, or has a block identification number of zero.

When a new block is created in buffer cache 5, that block is "clean." When data is written to the block, the block is "dirtied." File server 2 preferably uses delayed allocation for these dirty blocks. According to delayed allocation, blocks in storage 4 are not immediately allocated for the dirty blocks, and the dirty blocks preferably are not immediately written to storage 4. Thus, the dirty blocks are cached unallocated blocks. Such cached unallocated blocks are also called delayed allocated blocks.

Actual writing of the cached unallocated blocks (i.e., delayed allocated blocks) occurs at certain predetermined times or after the occurrence of certain predetermined conditions (i.e., NVRAM for persistent storage of file server operations fills up, a preset number of buffers or blocks are cached, etc.). Then, blocks in storage 4 are allocated for dirtied blocks in buffer cache 5, and the dirtied blocks are actually stored in storage 4.

File server 2 also includes incore information structure 8 with incore inodes 9 and incore information 10. An incore inode 9 is present for each file for which blocks are stored in buffer cache 5. The incore inodes associate the blocks with the file in a manner similar to inode 14 discussed below with respect to FIG. 2.

Each incore inode also includes a count of the number of cached unallocated blocks (i.e., delayed allocated blocks) associated with the inode. Incore information 10 preferably includes a count of how many total cached unallocated blocks are stored in buffer cache 5.

Figure 2:
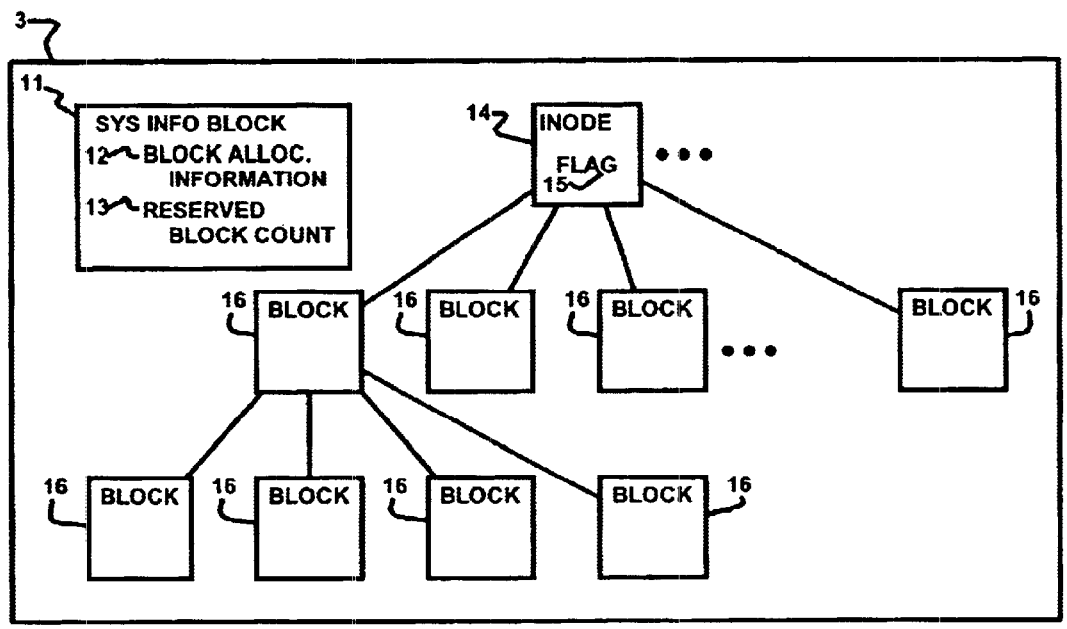
FIG. 2 is a block diagram of an organization of a file system in which blocks can be reserved for files.

FIG. 2 is a block diagram of an organization of file system 3. For the sake of brevity, many of the conventional features of file system 3 are not illustrated in FIG. 2 and are not discussed herein. Those skilled in the art will appreciate that a great many ways exist to implement these conventional features without departing from the invention.

File system 3 includes at least one system information block 11. This system information block includes at least block allocation information 12 and reserved block count 13 according to the invention. Block allocation information 12 includes at least information from which can be determined how many blocks of file system 3 are allocated to files. Reserved block count 13 includes a count of how many blocks in file system 3 have been reserved according to the invention.

An inode such as inode 14 is associated with each file stored in file system 3. Inode 14 is stored in storage 4. Inode 14 includes at least flag 15 that indicates whether or not block reservation according to the invention is active for the file to which the inode belongs. The operation of flag 15 is discussed below with respect to FIGS. 3 to 8. Inode 14 also can include file size information for its associated file.

Inode 14 for a file further includes information associating that file with blocks 16 in file system 3. These blocks preferably are 4 kilobytes long. Blocks 16 can be direct blocks, in which case data for the file is stored directly in the blocks. Blocks 16 also can be indirect blocks that store information associating other blocks with the file. Those other blocks in turn can store data or can point to yet more blocks.

For a file size of less than 64 bytes, no blocks are needed. Instead, data for the file is stored directly in inode 14. In a typical block configuration, each inode can point to up to sixteen other blocks. Thus, for file sizes between 64 bytes and 64 kilobytes, up to sixteen direct blocks are utilized. Each block in turn can point to 1024 other blocks. Thus, one level of indirection can accommodate files between 64 kilobytes and 64 megabytes (16 blocks pointing to 1024 blocks of 4 kilobytes each). Two levels of indirection can accommodate file sizes up to 64 gigabytes (16 blocks pointing to 1024 blocks, which each in turn point to 1024 blocks of 4 kilobytes each). More levels of indirection can be utilized, as needed. Of course, the invention is equally applicable to file systems that utilize different size blocks than 4 kilobytes and that are organized in different arrangements than shown in FIG. 2.

As data is written to a file in file system 3, the data is cached in block 6 in the buffer cache. Prior to writing the block 6 to storage 4, blocks are allocated to that file. File server 2 manages the storage of the data in the blocks and keeps track of block allocation. According to the invention, file server 2 also can reserve blocks for files before data is written to those files. File server 2 uses reserved block count 13 to keep track of how many blocks are reserved.

Reserved blocks preferably are not actually assigned to a file. Instead, file server 2 ensures that at least the number of blocks indicated by reserved block count 13 are kept free. Then as data is written to a file for which reservation is activated, the data is cached in block 6 in the buffer cache. Prior to writing the block 6 to storage 4, blocks are allocated to that file. Because those blocks are now allocated, space for the blocks no longer needs to be reserved in file system 3, so reserved block count 13 is decremented accordingly. These operations are discussed in more detail below.

Block allocation information 12, reserved block count 13, and inodes 14 with flags 15 preferably are stored in file system 3 on storage 4. Thus, whenever a snapshot of file system 3 is made for backup purposes, sufficient block allocation and reservation information is stored in the snapshot to reconstruct the block allocation and reservation status from the snapshot.

Figure 3:
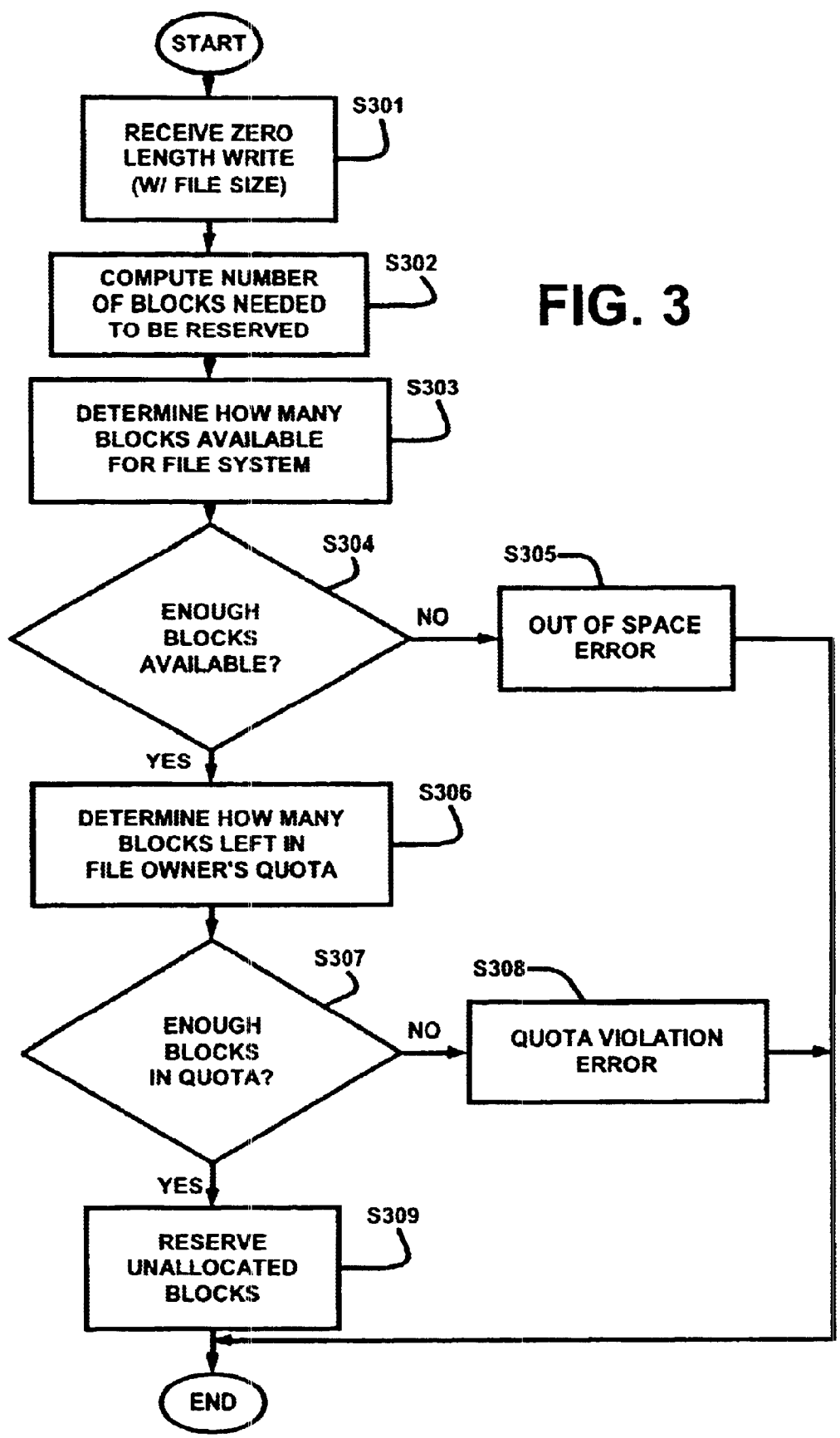
FIG. 3 is a flowchart for explaining reservation according to the invention of blocks for a file.

FIG. 3 is a flowchart for explaining reservation according to the invention of blocks for a file.

Briefly, the invention manages a file system for a file server. A file operation is received that signals a reservation operation for a file having a file size. A number of blocks that need to be reserved to accommodate the file is computed. A number of unallocated blocks is reserved in the file system equal to the number of blocks needed to be reserved to accommodate the file.

In more detail, in step S301, file server 2 receives a file operation that signals a reservation operation for a file. In the preferred embodiment of the invention, this file operation is a zero length write request. This write request preferably includes a parameter that identifies a size for the file for which the reservation is to be made. Alternatively, the file size can already be set in file system 3, possibly through a previous write command.

In step S302, a number of blocks needed to be reserved to accommodate the file is computed. This step is shown in more detail in FIG. 4.

Figure 4:
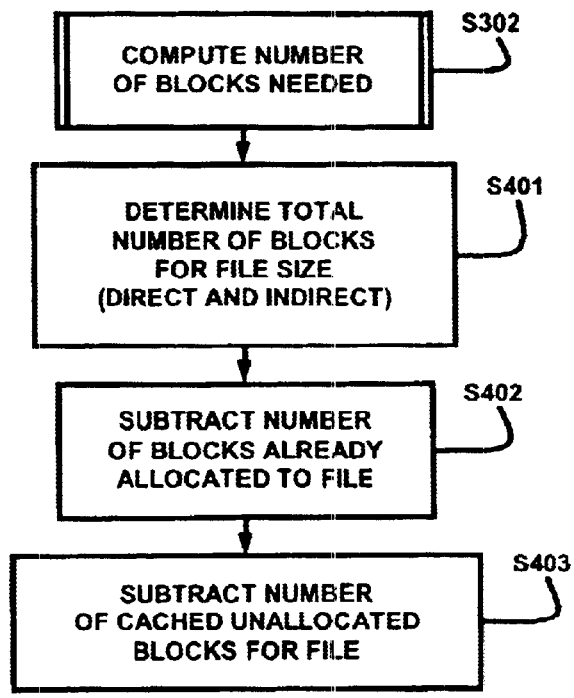
FIG. 4 is a flowchart for explaining computation of a number of blocks needed for a file.

In step S401 of FIG. 4, a number of blocks needed to accommodate the file size is computed. This number preferably is irrespective of information such as actual block allocation and reservation data. The number of blocks includes both direct blocks and indirect blocks, as described above with respect to FIG. 2.

For example, for a file of size 64 kilobytes, a preferred embodiment of the invention needs 16 direct blocks and no indirect blocks, for a total of 16 blocks. The number computed in step S401 preferably is generated by an algorithm that takes a file size as an input and generates a number of blocks as an output.

In step S402 of FIG. 4, a number of blocks already allocated to the file, for example as a result of previous write operations, is subtracted from the number of blocks needed to accommodate the file size. Information about the number of blocks allocated to the file it preferably is retrieved or derived from block allocation information 12 and/or inodes 14.

In step S403, a number of cached unallocated blocks for the file is subtracted from the result of step S402. While these blocks are unallocated, space for them is already accounted for through delayed allocation counters stored in the file server's incore structure, so there is no need to include these blocks in the reservation count. The number of unallocated cached blocks (i.e., delayed allocated blocks) for the file is stored in the associated incore inode 9, and the total count of delayed allocated blocks in buffer cache 5 is stored in incore information 10.

Thus, steps S401 through S403 determine a total number of direct and indirect blocks needed to accommodate the file size, and subtract from this number a total number of blocks already allocated for the file and a total number of cached unallocated blocks for the file. The result is the number of blocks that need to be reserved to accommodate the file. Of course, steps S402 and S403 can occur simultaneously or in a different order, as long as the number of needed blocks is determined.

Returning to FIG. 3, the number of blocks available for file system 3 is determined in step S303. This step is shown in more detail in FIG. 5.

Figure 5:
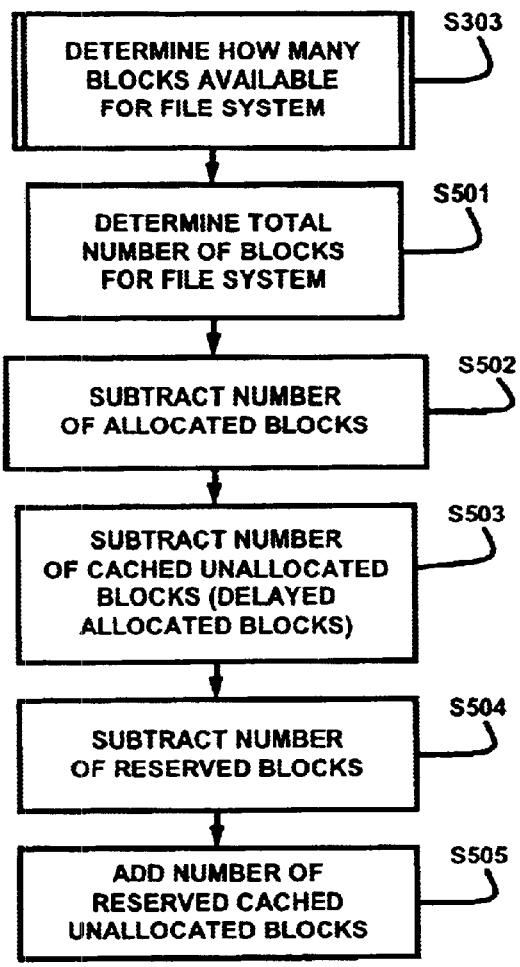
FIG. 5 is a flowchart for explaining determination of how many blocks are available for a file system.
Figure 6:
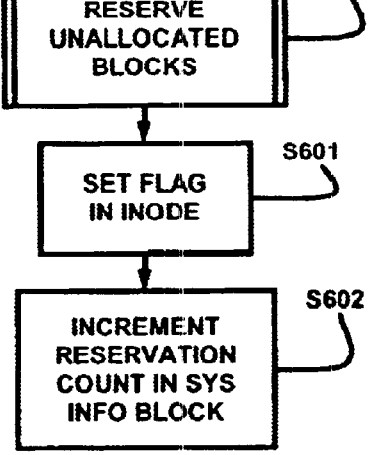
FIG. 6 is a flowchart for explaining reservation of unallocated blocks for a file.

In step S501 of FIG. 5, a total number of blocks for file system 3 is determined. This number is a substantially fixed number that usually only changes when storage 4 is physically altered, for example by permanent corruption of blocks (i.e., bad blocks), changes in hardware (i.e., addition or removal of disk drives), reformatting, and the like.

In step S502, a number of allocated blocks is subtracted from the total number of blocks. The number of allocated blocks preferably is determined from block allocation information 12 in system information block 11 of file system 3.

Is In step S503, a number of cached unallocated blocks (i.e., delayed allocated blocks) is subtracted from the result of step S503. The number of delayed allocated blocks is determined from incore information 10 for file system 3.

In step S504, a number of reserved blocks is subtracted from the result of step S503. The number of reserved blocks preferably is determined from reserved block count 13 in system information block 11 of file system 3.

In step S505, a number of reserved cached unallocated blocks is added to the result of step S504. File server 2 preferably keeps track of how many cached unallocated blocks in buffer cache 5 have flag 7 set, thereby indicating that those blocks are blocks for which reservation according to the invention is activated. This information preferably is kept up to date in incore information 10 for file system 3. This step is necessary since the reserved cached unallocated blocks are accounted for in the delayed allocation counters in incore information 10, since actual blocks in storage 4 have not yet been allocated for these blocks.

The result of steps S501 through S505 is a number of available blocks for the file system. Of course, steps S501 through S505 can occur simultaneously or in a different order, as long as the number of available blocks is determined.

Returning to FIG. 3, in step S304, the number of blocks needed to be reserved is compare with the number of available blocks. If the number of needed blocks exceeds the number of available blocks, not enough space is available in file system 3, and flow is diverted to step S305, where an error is returned. Otherwise, flow proceeds to step S306.

In step S306, a number of blocks remaining in the file owner's quota is determined. This operation is only performed if quotas are being enforced for file system 3. Then, in step S307, the quota is compared against the number of blocks needed to be reserved. If not enough blocks remain in the quota, flow is diverted to step S308, where an error is returned. Otherwise, flow proceeds to step S309.

Unallocated blocks are reserved in step S309. The number of blocks reserved is equal to the number of blocks needed, as determined in step S302. Step S309 is shown in more detail in FIG. 6.

In step S601, flag 15 in inode 14 for the file is set. This flag indicates that reservation semantics are being enforced for the file. Then, in step S602, reserved block count 13 in system information block 11 is incremented by the number of blocks needed to be reserved for the file.

After step S309, blocks have been reserved for the file.

Figure 7:
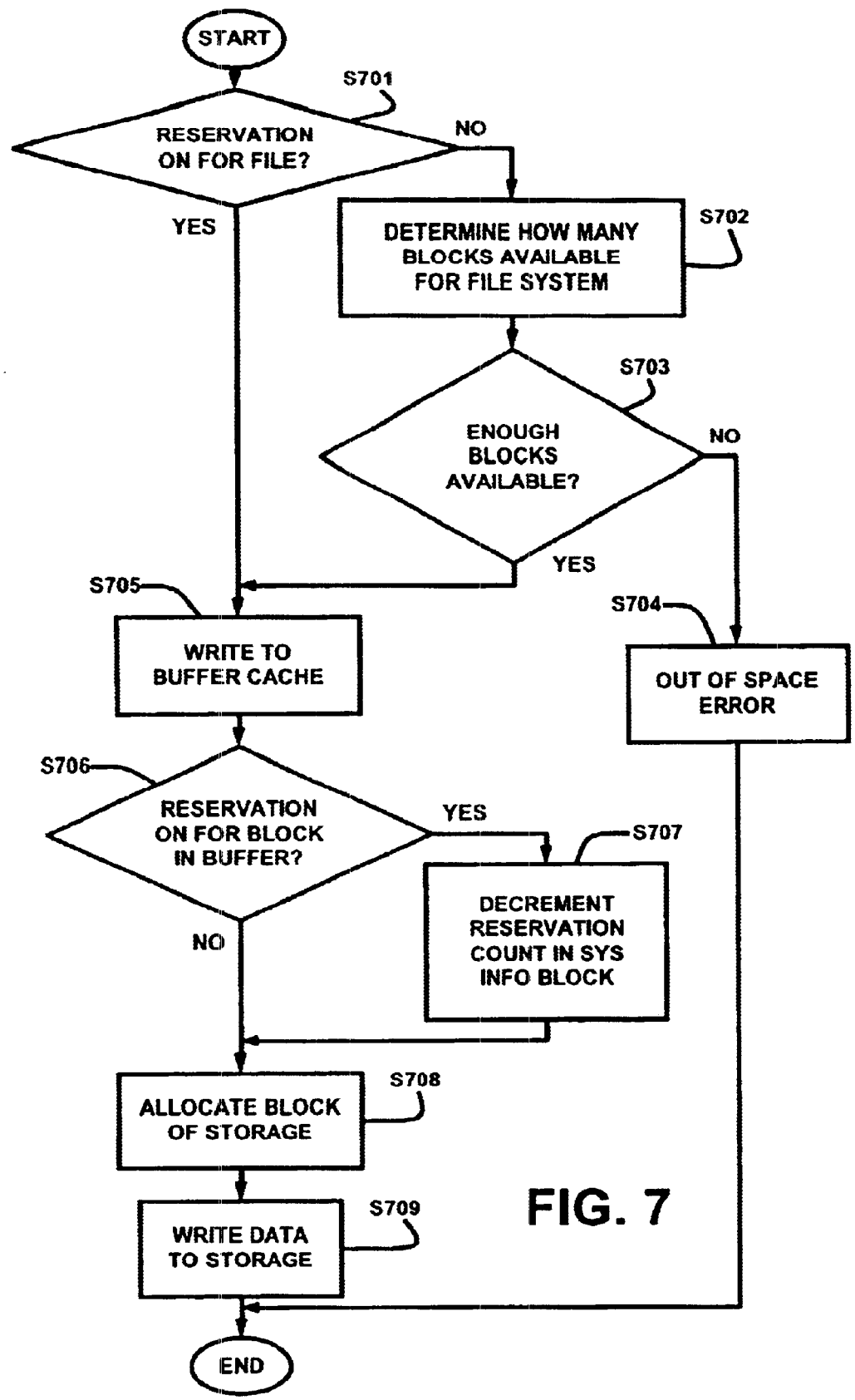
FIG. 7 is a flowchart for explaining allocation and writing of data to a file in a file system in which blocks can be reserved for files.

FIG. 7 is a flowchart for explaining allocation and writing of data to a file in a file system in which blocks can be reserved for files.

When data is to be written to file system 3 for a file, step S701 checks flag 15 of inode 14 for that file to determine whether or not block reservation has been performed for the file. If reservation has been performed, flow proceeds to step S705. Otherwise, flow proceeds to step S702 for space availability checking.

The number of blocks available for file system 3 is determined in step S702. Preferably, step S702 subtracts a number of allocated blocks, a number of cached unallocated blocks (i.e., delayed allocated blocks), and a number of reserved blocks from a total number of blocks in the file system, and adds to this a number of reserved cached unallocated blocks.

In step S703, the number of blocks needed to be allocated is compared with the number of available blocks. If the number of needed blocks exceeds the number of available blocks, not enough space is available in file system 3, and flow is diverted to step S704 where an error is returned. Otherwise, flow proceeds to steps S705.

In step S705, the data is written to a block or blocks in buffer cache 5 for file system 3. If reservation has been activated for the file, file server 3 ensures that flags 7 are set for the blocks.

Flow proceeds from step S705 to step S706 in order to write data from buffer cache 5 to storage 4. As mentioned above, data preferably is written from the buffer cache to the storage after the occurrence of certain predetermined conditions (i.e., NVRAM for persistent storage of file server operations fills up, a preset number of buffers or blocks are cached, etc.).

In step S706, file server 3 checks flags 7 for each block to be written to storage 4. File server 3 checks flags 7 to see if reservation according to the invention has been activated for the blocks. If reservation has been activated, flow proceeds to step S707. Otherwise, flow skips to step S708.

In step S707, reserved block count 13 is decremented by the number of reserved blocks to be written to storage. Because these blocks are actually going to be written to storage 4, space for the blocks no longer needs to be reserved. Decrementing the reserved block count releases the reservation of these blocks.

In step S708, a block or blocks of storage 4 are allocated for the data, and in step S709, the data is written to the block or blocks of storage 4.

Figure 8:
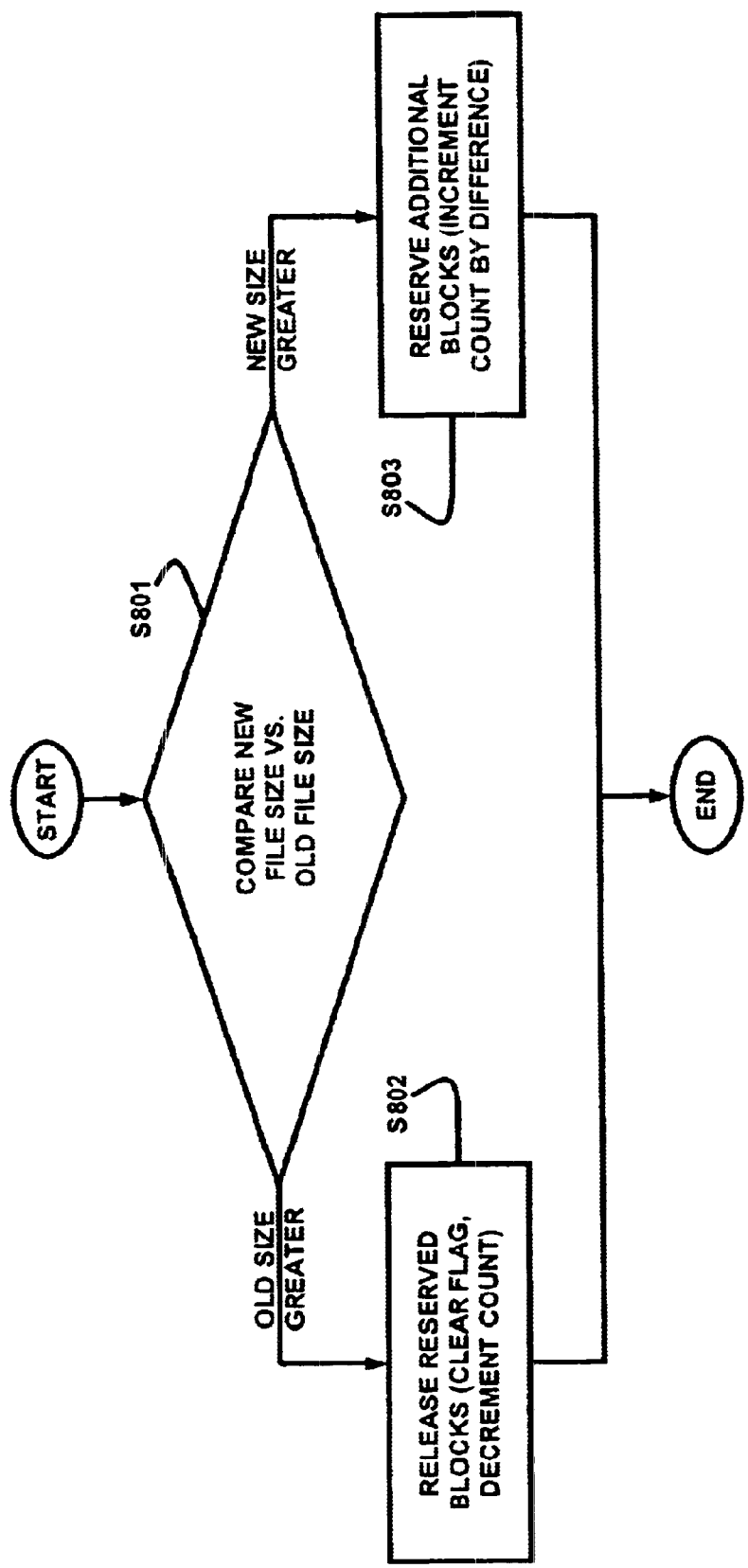
FIG. 8 is a flowchart for explaining block reservation when a file size changes.

FIG. 8 is a flowchart for explaining a reservation operation for a file for which reservation has already been performed, in which the reservation operation specifies a new file size different from a current (old) file size for the file. For example, the steps in FIG. 8 are performed when a first zero length write specifies a first file size, and then a second zero length write specifies a second different file size.

In step S801, the current file size is compared with a new file size for the reservation command. If the new file size is less than the old file size, flow proceeds to step S802, where remaining block reservations for the file are released. In order to release the block reservations, flag 15 in inode 14 for the file is cleared, and reserved block count 13 is decremented by the number of blocks still reserved for the file. This number is computed along the lines of step S302 shown in FIGS. 3 and 4, based on the current file size, the number of blocks allocated to the file, and the number of cached unallocated blocks for the file.

If the new file size is greater than the old file size, flow proceeds to step S803, where more blocks are reserved. The number of additional blocks reserved preferably is equal to the difference between the total number of direct and indirect blocks required by the new file size and the total number of direct and indirect blocks required by the current file size. These additional blocks are reserved by incrementing reserved block count 13 by this difference.

Alternative Embodiments

Although preferred embodiments of the invention are disclosed herein, many variations are possible which remain within the content, scope and spirit of the invention, and these variations would become clear to those skilled in the art after perusal of this application. For example, the invention is equally applicable to file servers and file systems that use different block sizes and block organizations, different buffer cache schemes (e.g., no delayed allocation), different layouts than the WAFL layout, and the like. In addition, the invention is not limited to the particular orderings of steps described above. Therefore, the scope of the invention encompasses the following claims and their legal equivalents and is not limited to the embodiment discussed above.

What is claimed is:

1. A method of managing a file system for a file server, comprising the steps of:

receiving a file operation that signals a reservation operation for a file for which reservation has already been performed, said reservation operation specifying a new file size different from a current file size for the file;

comparing the current file size with the new file size;

in the case that the current file size exceeds the new file size, releasing any remaining block reservations for the file; and in the case that the new file size exceeds the current file size, reserving for later allocation in the file system an additional number of unallocated blocks equal to a difference between a total number of direct and indirect blocks required by the new file size and a total number of direct and indirect blocks required by the current file size.

2. A method as in claim 1, wherein the file system uses a write anywhere file system layout.

3. A method as in claim 1, wherein the file operation that signals the reservation operation is a zero length write request.

4. A method as in claim 1, wherein the file operation that signals the reservation operation includes a parameter that specifies the file size.

5. A method as in claim 1, wherein the step of releasing remaining block reservations for the file further comprises the steps of:
resetting a flag in an inode for the file that indicates blocks have been reserved for the file; and
decrementing a reserved block count in a file system information block by a number of blocks still reserved for the file, the reserved block count indicating how many unallocated blocks have been reserved for files in the file system.

6. A method as in claim 1, further comprising the step of checking that a number of available blocks in the file system is greater than the additional number of unallocated blocks, wherein an error is returned in a case that the number of available blocks is less than the additional number of blocks.

7. A method as in claim 6, wherein the number of available blocks in the file system is determined by subtracting a number of allocated blocks, a number of cached unallocated blocks, and a number of reserved blocks from a total number of blocks in the file system, and adding a number of reserved cached unallocated blocks.

8. A method as in claim 1, further comprising the step of checking that the additional number of blocks does not exceed a remainder of a quota for an owner of the file, wherein an error is returned in a case that the additional number of blocks exceeds the remainder of the quota.

9. A method as in claim 1, further comprising the step of releasing reservation of blocks as those blocks are written to storage.

10. A method as in claim 9, wherein the step of releasing reservation of blocks further comprises the step of decrementing a reserved block count in a file system information block by a number of released blocks, the reserved block count indicating how many blocks total have been reserved for files in the file server.

11. A file server that manages a file system, comprising:
mass storage that stores files for the file system;
a processor that executes instructions to manage the file system; and
a memory storing information including instructions, the instructions executable by the processor to manage the file system, the instructions comprising: (a) receiving a file operation that signals a reservation operation for a file for which reservation has already been performed, said reservation operation specifying a new file size different from a current file size for the file; (b) comparing the current file size with the new file size; (c) in the case that the current file size exceeds the new file size, releasing any remaining block reservations for the file; and (d) in the case that the new file size exceeds the current file size, reserving for later allocation in the file system an additional number of unallocated blocks equal to a difference between a total number of direct and indirect blocks required by the new file size and a total number of direct and indirect blocks required by the current file size.

12. A file server as in claim 11, wherein the file system uses a write anywhere file system layout.

13. A file server as in claim 11, wherein the file operation that signals the reservation operation is a zero length write request.

14. A file server as in claims 11, wherein the file operation that signals the reservation operation includes a parameter that specifies the file size.

15. A file server as in claim 11, wherein the step of releasing remaining block reservations for the file further comprises the steps of:
resetting a flag in an inode for the file that indicates blocks have been reserved for the file; and
decrementing a reserved block count in a file system information block by a number of blocks still reserved for the file, the reserved block count indicating how many unallocated blocks have been reserved for files in the file system.

16. A file server as in claim 11, wherein the instructions further comprise the step of checking that a number of available blocks in the file system is greater than the additional number of unallocated blocks, and wherein an error is returned in a case that the number of available blocks is less than the additional number of blocks.

17. A file server as in claim 16, wherein the number of available blocks in the file system is determined by subtracting a number of allocated blocks, a number of cached unallocated blocks, and a number of reserved blocks from a total number of blocks in the file system, and adding a number of reserved cached unallocated blocks.

18. A file server as in claim 11, wherein the instructions further comprise the step of checking that the additional number of blocks does not exceed a remainder of a quota for an owner of the file, and wherein an error is returned in a case that the additional number of blocks exceeds the remainder of the quota.

19. A file server as in claim 11, wherein the instructions further comprise the step of releasing reservation of blocks as those blocks are written to storage.

20. A file server as in claim 19, wherein the step of releasing reservation of blocks further comprises the step of decrementing a reserved block count in a file system information block by a number of released blocks, the reserved block count indicating how many blocks total have been reserved for files in the file server.

21. A memory storing information including instructions, the instructions executable by a processor to manage a file system, the instructions comprising the steps of:
receiving a file operation that signals a reservation operation for a file for which reservation has already been performed, said reservation operation specifying a new file size different from a current file size for the file;
comparing the current file size with the new file size;
in the case that the current file size exceeds the new file size, releasing any remaining block reservations for the file; and
in the case that the new file size exceeds the current file size, reserving for later allocation in the file system an additional number of unallocated blocks equal to a difference between a total number of direct and indirect blocks required by the new file size and a total number of direct and indirect blocks required by the current file size.

22. A memory as in claim 21, wherein the file system uses a write anywhere file system layout.

23. A memory as in claim 21, wherein the file operation that signals the reservation operation is a zero length write request.

24. A memory as in claim 21, wherein the file operation that signals the reservation operation includes a parameter that specifies the file size.

25. A memory as in claim 21, wherein the step of releasing remaining block reservations for the file further comprises the steps of:

resetting a flag in an inode for the file that indicates blocks have been reserved for the file; and decrementing a reserved block count in a file system information block by a number of blocks still reserved for the file, the reserved block count indicating how many unallocated blocks have been reserved for files in the file system.

26. A memory as in claim 21, wherein the instructions farther comprise the step of checking that a number of available blocks in the file system is greater than the additional number of unallocated blocks, and wherein an error is returned in a case that the number of available blocks is less than the additional number of blocks.

27. A memory as in claim 26, wherein the number of available blocks in the file system is determined by subtracting a number of allocated blocks, a number of cached unallocated blocks, and a number of reserved blocks from a total number of blocks in the file system, and adding a number of reserved cached unallocated blocks.

28. A memory as in claim 21, wherein the instructions further comprise the step of checking that the additional number of blocks does not exceed a remainder of a quota for an owner of the file, and wherein an error is returned in a case that the additional number of blocks exceeds the remainder of the quota.

29. A memory as in claim 21, wherein the instructions further comprise the step of releasing reservation of blocks as those blocks are written to storage.

30. A memory as in claim 29, wherein the step of releasing reservation of blocks further comprises the step of decrementing a reserved block count in a file system information block by a number of released blocks, the reserved block count indicating how many blocks total have been reserved for files in the file server.

* * * * *